United States Patent
McGuirk et al.

(10) Patent No.: US 7,930,200 B1
(45) Date of Patent: Apr. 19, 2011

(54) COMPUTER-IMPLEMENTED SYSTEMS AND METHODS FOR CROSS-PRICE ANALYSIS

(75) Inventors: Ann Mary McGuirk, Raleigh, NC (US); Yung-Hsin Chien, Apex, NC (US)

(73) Assignee: SAS Institute Inc., Cary, NC (US)

( * ) Notice: Subject to any disclaimer, the term of this patent is extended or adjusted under 35 U.S.C. 154(b) by 606 days.

(21) Appl. No.: 11/934,397

(22) Filed: Nov. 2, 2007

(51) Int. Cl.
*G06F 17/10* (2006.01)
*G06F 17/00* (2006.01)
*G06Q 10/00* (2006.01)
*G06Q 20/00* (2006.01)

(52) U.S. Cl. ........... 705/7.31; 705/1.1; 705/30; 705/400
(58) Field of Classification Search ............... 705/10, 705/1.1, 20, 7.31, 400
See application file for complete search history.

(56) References Cited

U.S. PATENT DOCUMENTS

| | | | |
|---|---|---|---|
| 5,627,973 A | 5/1997 | Armstrong et al. | |
| 5,652,842 A | 7/1997 | Siegrist, Jr. et al. | |
| 5,767,854 A | 6/1998 | Anwar | |
| 5,799,286 A | 8/1998 | Morgan et al. | |
| 5,873,069 A * | 2/1999 | Reuhl et al. | 705/20 |
| 5,926,820 A | 7/1999 | Agrawal et al. | |
| 5,953,707 A | 9/1999 | Huang et al. | |
| 5,960,407 A * | 9/1999 | Vivona | 705/10 |
| 5,963,910 A | 10/1999 | Ulwick | |
| 5,999,908 A | 12/1999 | Abelow | |
| 6,009,407 A | 12/1999 | Garg | |
| 6,014,640 A | 1/2000 | Bent | |
| 6,029,139 A | 2/2000 | Cunningham et al. | |
| 6,078,892 A | 6/2000 | Anderson et al. | |
| 6,115,691 A | 9/2000 | Ulwick | |
| 6,115,694 A * | 9/2000 | Cheetham et al. | 705/10 |
| 6,151,582 A | 11/2000 | Huang et al. | |
| 6,182,060 B1 | 1/2001 | Hedgcock et al. | |
| 6,236,977 B1 | 5/2001 | Verba et al. | |
| 6,237,138 B1 | 5/2001 | Hameluck et al. | |
| 6,249,768 B1 | 6/2001 | Tulskie et al. | |
| 6,275,812 B1 | 8/2001 | Haq et al. | |
| 6,286,005 B1 | 9/2001 | Cannon | |
| 6,321,206 B1 | 11/2001 | Honarvar | |
| 6,397,224 B1 | 5/2002 | Zubeldia et al. | |
| 6,456,999 B1 | 9/2002 | Netz | |
| 6,470,344 B1 | 10/2002 | Kothuri et al. | |

(Continued)

FOREIGN PATENT DOCUMENTS

WO    WO 01/11522    2/2001

OTHER PUBLICATIONS http://www.okstate.edu/sas.*

(Continued)

*Primary Examiner* — Fadey S Jabr
(74) *Attorney, Agent, or Firm* — Jones Day

(57) ABSTRACT

Computer-implemented systems and methods for determining demand of products. A system and method can be configured to determine a price with respect to a first attribute of a first product. This determination is based upon the price data of the products which compete with the first product and whose attributes are alike with respect to the first product's attributes except for a first attribute. The determined single price is used in a mathematical model for determining demand for the first product.

11 Claims, 11 Drawing Sheets

U.S. PATENT DOCUMENTS

| | | | |
|---|---|---|---|
| 6,484,179 B1 | 11/2002 | Roccaforte | |
| 6,502,077 B1 | 12/2002 | Speicher | |
| 6,526,526 B1 | 2/2003 | Dong et al. | |
| 6,546,135 B1 | 4/2003 | Lin et al. | |
| 6,581,068 B1 | 6/2003 | Bensoussan et al. | |
| 6,584,447 B1 | 6/2003 | Fox et al. | |
| 6,611,829 B1 | 8/2003 | Tate et al. | |
| 6,640,215 B1 | 10/2003 | Galperin et al. | |
| 6,728,724 B1 | 4/2004 | Megiddo et al. | |
| 6,735,570 B1 | 5/2004 | Lacy et al. | |
| 6,750,864 B1 | 6/2004 | Anwar | |
| 6,898,603 B1 | 5/2005 | Petculescu et al. | |
| 6,901,406 B2 | 5/2005 | Nabe et al. | |
| 6,907,382 B2 | 6/2005 | Urokohara | |
| 6,970,830 B1 | 11/2005 | Samra et al. | |
| 7,039,594 B1 | 5/2006 | Gersting | |
| 7,089,266 B2 | 8/2006 | Stolte et al. | |
| 7,092,929 B1 | 8/2006 | Dvorak et al. | |
| 7,133,876 B2 | 11/2006 | Roussopoulos et al. | |
| 7,346,538 B2 | 3/2008 | Reardon | |
| 7,370,366 B2 | 5/2008 | Lacan et al. | |
| 7,523,047 B1* | 4/2009 | Neal et al. | 705/10 |
| 2001/0049642 A1* | 12/2001 | Harris | 705/27 |
| 2002/0013757 A1 | 1/2002 | Bykowsky et al. | |
| 2002/0046096 A1 | 4/2002 | Srinivasan et al. | |
| 2002/0072953 A1 | 6/2002 | Michlowitz et al. | |
| 2002/0073009 A1* | 6/2002 | Hogg et al. | 705/37 |
| 2002/0107723 A1 | 8/2002 | Benjamin et al. | |
| 2002/0116237 A1 | 8/2002 | Cohen et al. | |
| 2002/0123930 A1 | 9/2002 | Boyd et al. | |
| 2002/0169654 A1 | 11/2002 | Santos et al. | |
| 2002/0169655 A1 | 11/2002 | Beyer et al. | |
| 2002/0178049 A1 | 11/2002 | Bye | |
| 2003/0023598 A1 | 1/2003 | Janakiraman et al. | |
| 2003/0078830 A1 | 4/2003 | Wagner et al. | |
| 2003/0083924 A1 | 5/2003 | Lee et al. | |
| 2003/0083925 A1 | 5/2003 | Weaver et al. | |
| 2003/0088458 A1 | 5/2003 | Afeyan et al. | |
| 2003/0097292 A1 | 5/2003 | Chen et al. | |
| 2003/0110072 A1 | 6/2003 | Delurgio et al. | |
| 2003/0110080 A1 | 6/2003 | Tsutani et al. | |
| 2003/0120584 A1 | 6/2003 | Zarefoss et al. | |
| 2003/0126010 A1 | 7/2003 | Barns-Slavin | |
| 2003/0204408 A1* | 10/2003 | Guler et al. | 705/1 |
| 2003/0208402 A1 | 11/2003 | Bibelnieks et al. | |
| 2003/0208420 A1 | 11/2003 | Kansal | |
| 2003/0236721 A1 | 12/2003 | Plumer et al. | |
| 2004/0068413 A1* | 4/2004 | Musgrove et al. | 705/1 |
| 2004/0093296 A1 | 5/2004 | Phelan et al. | |
| 2004/0111388 A1 | 6/2004 | Boiscuvier et al. | |
| 2004/0199781 A1 | 10/2004 | Erickson et al. | |
| 2005/0033761 A1 | 2/2005 | Guttman et al. | |
| 2005/0055275 A1* | 3/2005 | Newman et al. | 705/14 |
| 2005/0066277 A1 | 3/2005 | Leah et al. | |
| 2005/0262108 A1 | 11/2005 | Gupta | |
| 2006/0218162 A1* | 9/2006 | Keil et al. | 707/100 |
| 2007/0050235 A1* | 3/2007 | Ouimet | 705/10 |
| 2007/0055482 A1 | 3/2007 | Goodermote et al. | |
| 2007/0073758 A1* | 3/2007 | Perry et al. | 707/102 |
| 2007/0174119 A1 | 7/2007 | Ramsey et al. | |
| 2008/0033787 A1* | 2/2008 | Keil et al. | 705/10 |
| 2008/0270326 A1* | 10/2008 | Musgrove et al. | 705/400 |
| 2009/0210355 A1* | 8/2009 | Dagum et al. | 705/400 |
| 2009/0327167 A1* | 12/2009 | Ginzel et al. | 705/500 |

OTHER PUBLICATIONS

Mazzeo, Michael J., Cometitive Outcomes in Product-Differentiated Oligopoly, Nov. 2002, The Review of Economics and Statistics, pp. 716-728.*

Horsky, Dan et al., "New Brand Positioning and Pricing in an Oligopolistic Market", Spring 1992, Marketing Science, vol. 11, No. 2.*

Canan, Basak, "Strategic Pricing in a Differentiated Product Oligopoly Model: Fluid Milk in Bostno", 2006, Agricultural Economics, pp. 27-33.*

"An empirical examination of a process-oriented IT business success model", Apr. 2006, Information Technology and Management, V. 7, N. 2, pp. 55.*

K R Balachandran; Bin Srinidhi, "Strategic positioning and cost management along quality dimensions", 1996, International Journal of Quality Science, V. 1, N. 2, pp. 8-25.*

International Search Report, issued Jun. 22, 2004, for International Application PCT/US03/13394.

De Prisco et al., "On Optimal Binary Search Trees", Information Processing Letters, vol. 45, pp. 249-253 (Apr. 1993).

Pedersen et al., "Multidimensional Database Technology", IEEE, Computer, vol. 34, Issue 12, pp. 40-46 (Dec. 2001).

Baud, Nicolas et al., "Internal data, external data and consortium data for operational risk measurement: How to pool data properly?", Groupe de Recherche Operationnelle, Credit Lyonnais, France, pp. 1-18 (Jun. 1, 2002).

Na, H.S. et al., "Data Scaling for Operational Risk Modelling", ERIM Report Series Research in Management, 24 pp. (Dec. 2005).

Peemoller, Fred A., "Operational Risk Data Pooling", Frankfurt/Main, Deutsche Bank AG, 38 pp. (Feb. 7, 2002).

Model1 by Group 1 Software, www.g1.com, Aug. 29, 1999, pp. 1-16, retrieved from Google.com and archive.org.

SAS Institute, Inc., www.sas.com, Jan. 29, 1998, pp. 1-28, retrieved from Google.com and archive.org.

Hollander, Geoffrey, "Modell deftly parses customer characteristics", InfoWorld, May 25, 1998, vol. 20, No. 21, pp. 1-4, retrieved from Dialog, file 148.

"Unica Releases Model 1 Enterprise Edition", Business Wire, Oct. 29, 1998, pp. 1-3, retrieved from Proquest Direct.

Rosen, Michele, "There's Gold in That There Data", Insurance & Technology, Dec. 1998, vol. 23, No. 12, pp. 1-6, retrieved from Dialog, file 16.

Saarenvirta, Data Mining to Improve Profitability, CMA Magazine, vol. 72, No. 2, Mar. 1998, pp. 8-12.

Johnson et al, Recent Developments and Future Directions in Mathematical Programming, IBM Systems Journal, vol. 31, No. 1, 1992, p. 79-93.

Balintfy et al, Binary and Chain Comparisons with an Experimental Linear Programming Food Price Index, The Review of Economics and Statistics, vol. 52, No. 3, Aug. 1970, pp. 324-330.

Manchanda et al, The "Shopping Basket"; A Model for Multi-Category Purchase Incidence Decisions, Marketing Science, vol. 18, No. 2, 1999, pp. 95-114.

Data Mining News, Looking Past Automation, MarketSwitch Focuses on Optimization of Marketing Campaigns, Data Mining News, May 10, 1999.

Porter-Kuchay, Multidimensional Marketing, Target Marketing, Jan. 2000.

Spiegelman, Optimizers Assist in Specialized marketing Efforts, Computer Reseller News, Nov. 22, 1999.

Horngren, Charles T. et al., "Cost Accounting a Managerial Emphasis", Tenth Edition, Chapter 14, pp. 497-534, 2000.

"Advances in Mathematical Programming and Optimization in the SAS System" by Kearney, SAS Institute, SUGI Proceedings, 1999.

"SAS/OR Optimization Procedures, with Applications to the Oil Industry" by Cohen et al, SAS Institute, SUGI Proceedings, 1994.

"Supply chain design and analysis: models and methods" by Beamon, International Journal of Production Economics, 1998.

"An effective supplier development methodology for enhancing supply chain performance" by Lee et al, ICMIT, 2000.

"Perfect and Open Ratings Form Alliance to Provide Critical Supplier Performance Ratings to Private Exchanges and Net Markets", Business Wire, Oct. 30, 2000.

"12 Technologies: i2 releases i2 five.two-the complete platform for dynamic value chain management; flexible, intuitive, powerful solutions designed to help companies gain efficiencies and drive revenue", M2 Presswire, Oct. 25, 2001.

"Simulation Optimization Using Soft Computing" by Andres Medaglia, PhD dissertation for Operations Research Department at North Carolina State University, Jan. 24, 2001.

"Supplier Selection and Management system Considering Relationships in Supply Chain Management" by Lee et al, IEEE Transactions on Engineering Management, Aug. 2001.

"Solver setting for optimal solutions" by Ananda Samudhram, New Straits Times, Nov. 22, 1999.

"Evaluating Suppliers of Complex Systems: A multiple criteria approach" by Cook et al, The Journal of the Operational Research Society, Nov. 1992.

* cited by examiner

COMPUTER-IMPLEMENTED SYSTEMS AND METHODS FOR CROSS-PRICE ANALYSIS

TECHNICAL FIELD

This document relates generally to computer-implemented systems and methods for price analysis and more particularly to computer-implemented systems and methods for cross-price analysis.

BACKGROUND

Retailers face a difficult task when attempting to establish prices for the products that they offer. The task involves balancing the price of the products with consumer demand of the products. The task is made even more difficult if the retailers are confronted with many products that have to be priced.

Pricing of a specific product is rarely done in isolation. Instead, the process of establishing a price of a product involves consideration of the prices of related products (cross-prices). However, including the cross-prices of related products can quickly lead to a demand model with too many parameters to estimate—particularly with a demand model that attempts to price at a low level, such as at the Stock Keeping Unit (SKU) level. (The SKU is a unique number assigned to each style/size combination of a product.)

A current approach to limit the number of estimated cross-price parameters is described in the following publication: Bruce G. S. Hardie et al., "*Attribute-based Market Share Models: Methodological Development and Managerial Applications*," University of Pennsylvania, Working Paper 98-009, pp. 1-48, 1998. The approach suggests developing measures of cross-price effects at the attribute level for each SKU. However, the cross-price variable approach disclosed therein exhibits significant disadvantages, such as not explaining demand well which adversely affects the performance of regression models that are attempting to predict demand.

SUMMARY

In accordance with the teachings provided herein, systems and methods for operation upon data processing devices are provided to determine demand of products, wherein each of the products share a common set of attributes and include a first product as well as products that compete with the first product. As an example, a system and method can be configured wherein price data is received about the products. With respect to a first attribute of the first product, a single price is determined based upon the price data of the products which compete with the first product and whose attributes are alike with respect to the first product's attributes except for the first attribute. The determined single price is used in a mathematical model for determining demand for the first product. The determined single price being based upon the price data of the products which compete with the first product allows the competing product prices to affect the determined price for the first product.

DETAILED DESCRIPTION

Figure 1:
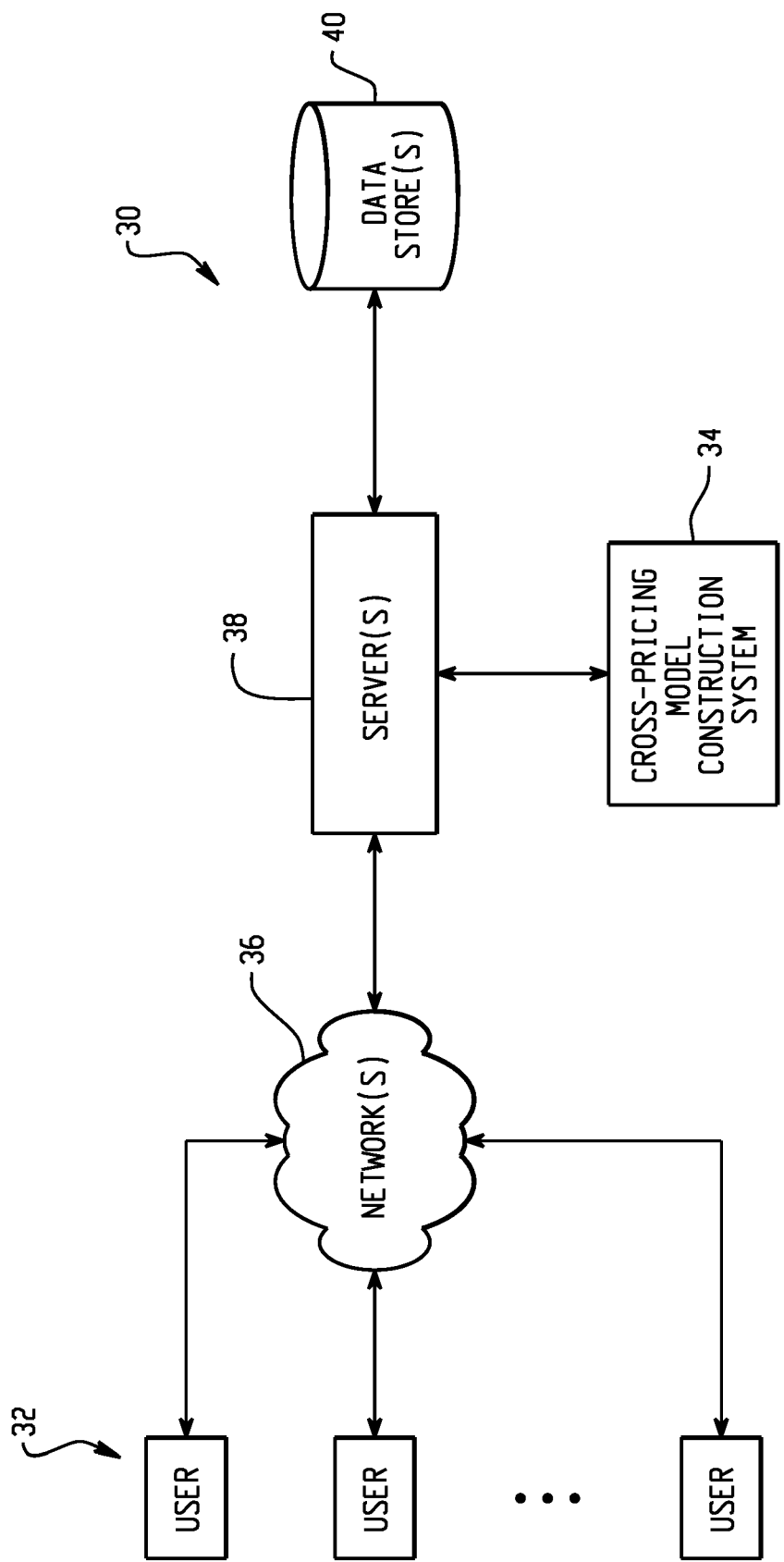
FIG. 1 is a block diagram depicting an environment wherein users can interact with a cross-pricing model construction system.

FIG. 1 depicts at 30 an environment wherein users 32 can interact with a cross-pricing model construction system 34. The cross-pricing model construction system 34 provides for the generation of pricing values that allow a model to better predict consumer demand for products. The product pricing values are generated by taking into account cross-pricing effects of competing products.

With respect to the cross-pricing model construction system 34, the users 32 can interact with such a system 34 through a number of ways, such as over one or more networks 36. Server(s) 38 accessible through the network(s) 36 can host the system 34. One or more data stores 40 can store the data to be analyzed by the system 34 as well as any intermediate or final data generated by the system 34, such as input information that is received about competing products as well as the pricing values that are generated by system 34 for use by a consumer demand model.

The system 34 can be an integrated web-based reporting and analysis tool that provides users flexibility and functionality for performing product cross-price analysis. It should be understood that the system 34 could also be provided on a stand-alone computer for access by a user.

Figure 2:
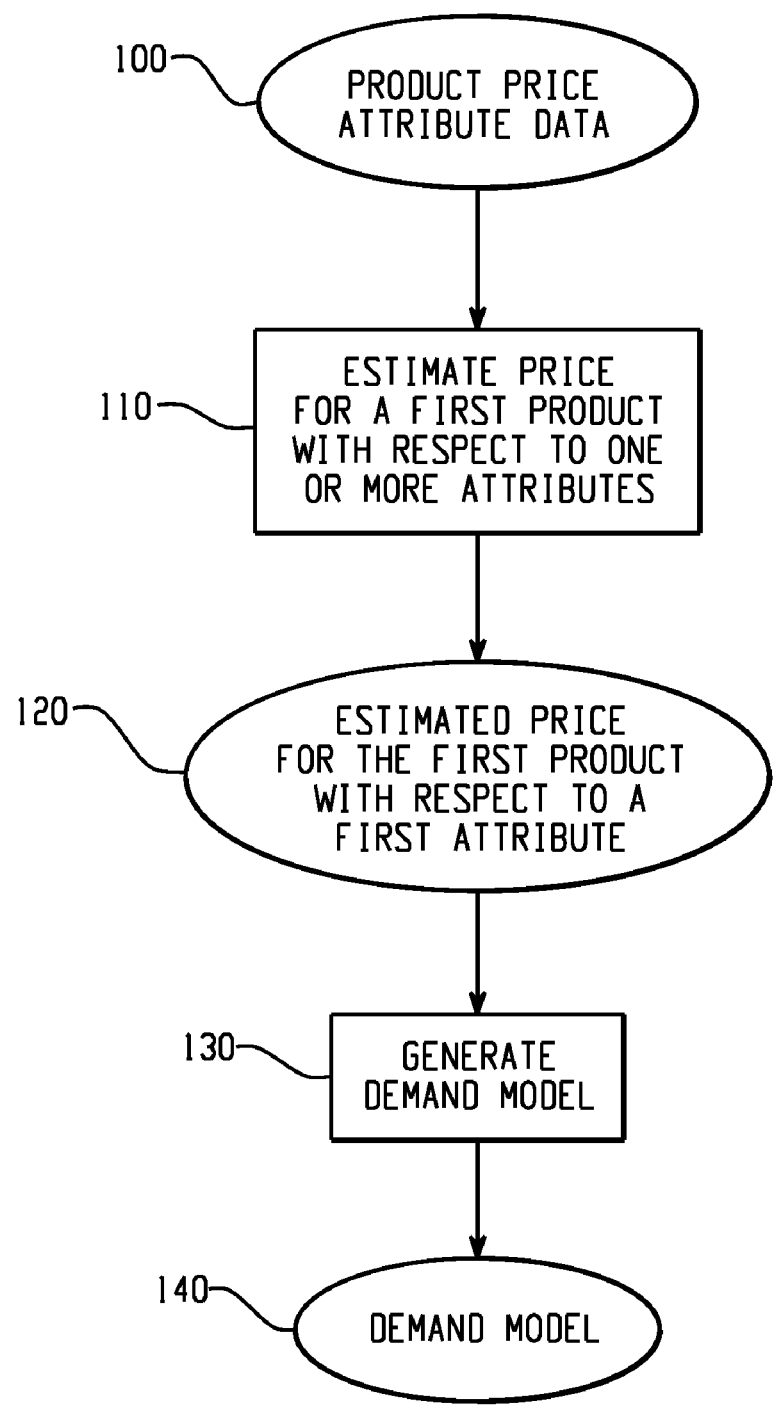
FIG. 2 is a process flow diagram that depicts an operational scenario for determining cross-price variables.

FIG. 2 depicts an operational scenario for determining statistically meaningful and effective cross-price variables that are effective in consumer product demand models. The operational scenario determines a cross-price variable that is based upon (e.g., a weighted average of) the prices of products that are the same as the product in question by all but one attribute.

With reference to FIG. 2, process 110 receives product price attribute data 100. The data 100 includes information about the product to be priced as well as information about any competing products that are to be included in the analysis. Based upon the input data 100, process 110 estimates a price for the product with respect to an attribute of that product.

Process 130 uses the estimated price 120 to generate a demand model 140. For example, the demand model 140 can be a regression model whose parameters are based upon the estimated price data generated by process 110. Because of the manner in which the estimated price is generated via this approach, the demand model 140 will exhibit better predictive performance when determining what level of demand there will be for a product by consumers.

Figure 3:
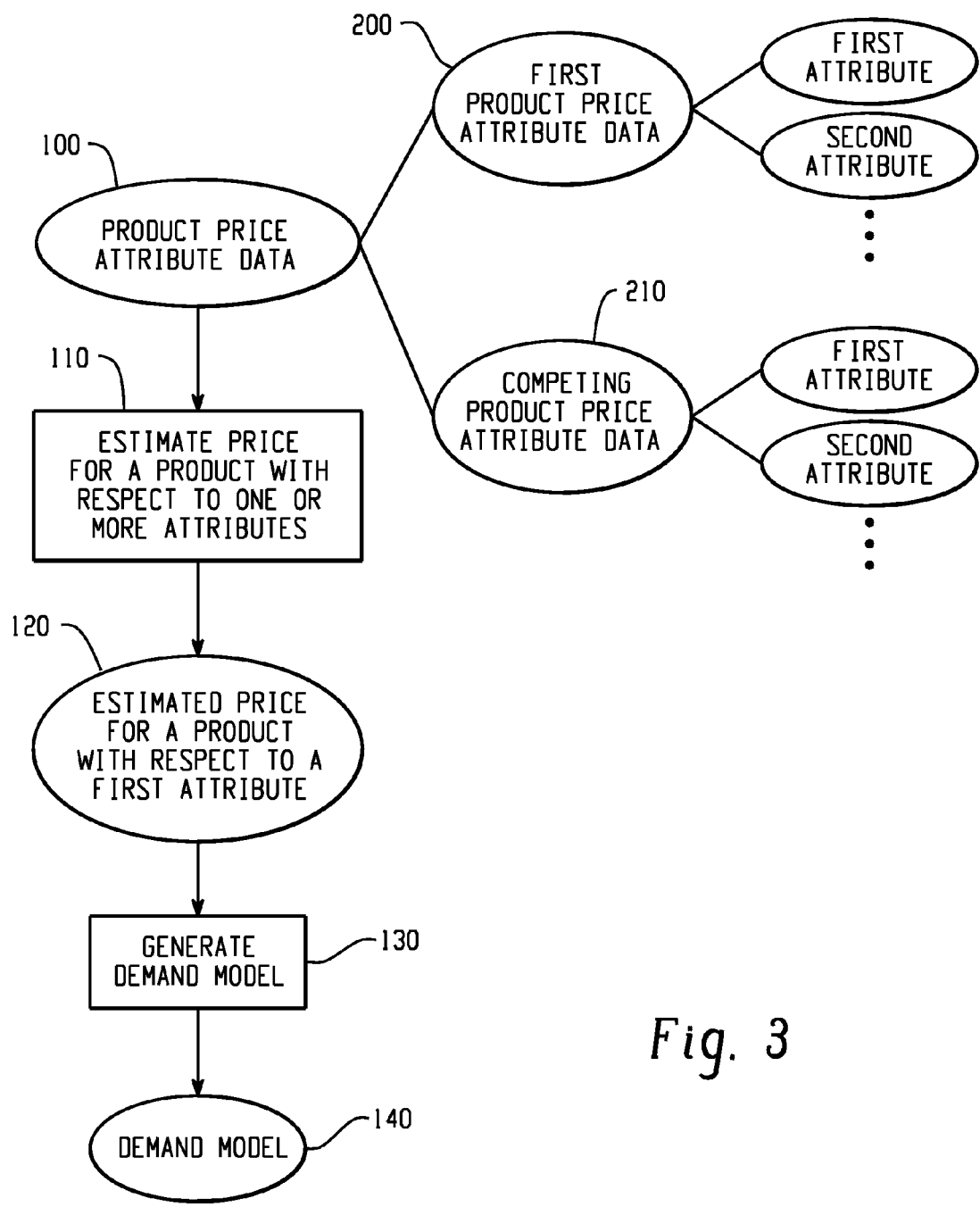
FIG. 3 is a process flow diagram depicting information about multiple product attributes being included in the input product price attribute data.

FIG. 3 depicts that information about multiple product attributes (200, 210) are included in the input product price attribute data 100. More specifically, the input data 100 contains information 200 about a plurality of attributes for the product in question and information 210 about a plurality of attributes for the products that are deemed to be in competition with the product in question.

The products can have many different attributes. As an illustration, a product can have such attributes such as packaging size, type, brand, color, etc. After selecting one of the attributes as a cross-price variable, process 110 provides an estimated product price 120 by examining the prices of products that are the same as the product in question by all but that one selected attribute. In one situation, the selected attribute could be the packaging size attribute, while in another situation it could be a different attribute such as product type.

As another illustration, consider trying to estimate the demand for a 6-pack of Bud Light beer (e.g., 6-12 oz. bottles). This example assesses how we capture the effect of the prices of competing products. Too many products compete to add the price of each one in a demand model. However a system can be configured as shown in FIG. 4 to use a particular attribute of the product in question as a cross-price variable in the manner described above.

Figure 4:
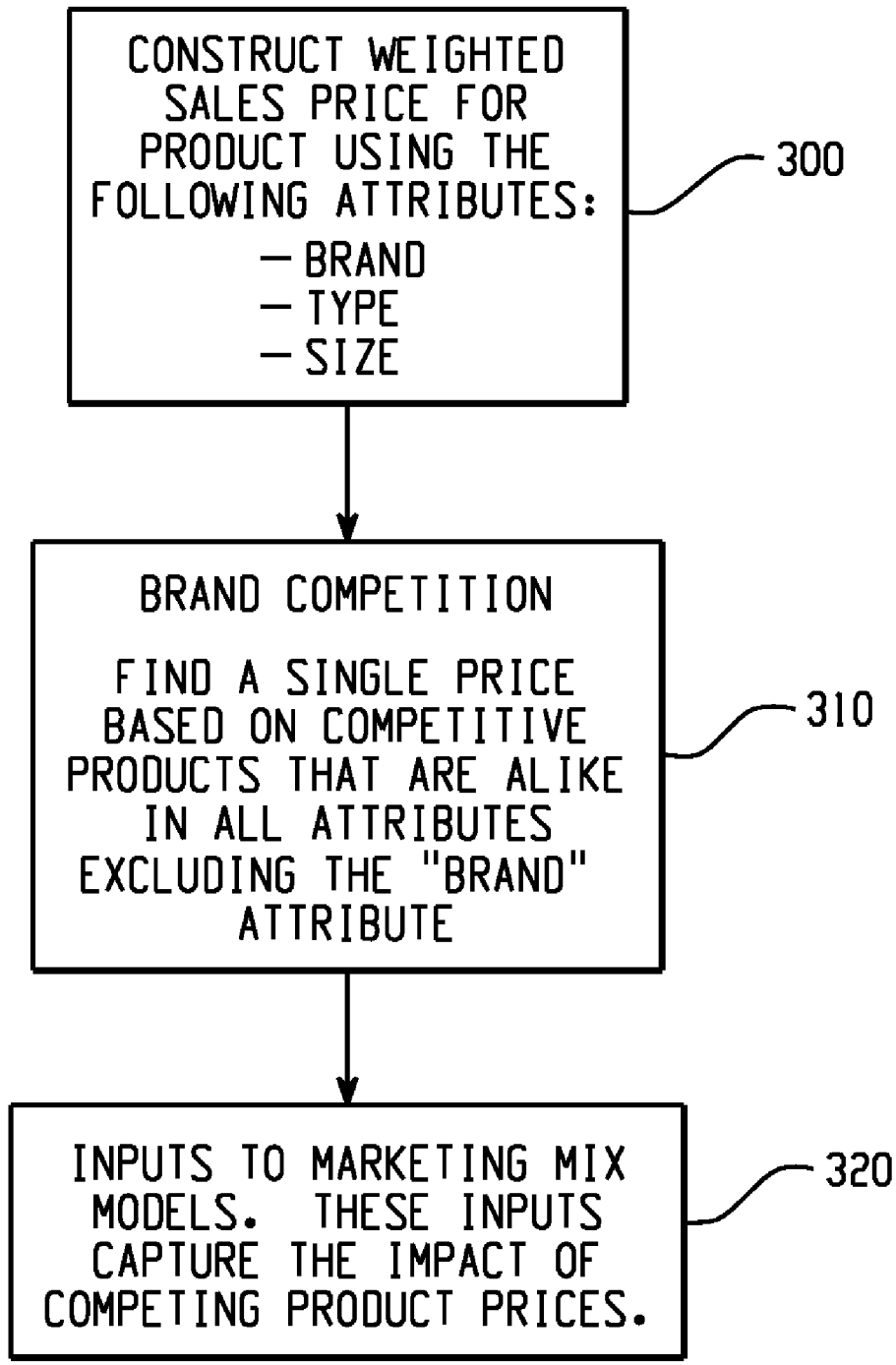
FIG. 4 is a flowchart depicting use of a particular product attribute as a cross-price variable.

With reference to FIG. 4, process 300 receives product information about the following attributes: brand, type, and pack size. In this example, process 310 selects the brand of the beer product as the cross-price variable. Accordingly, process 310 uses brand as the cross-price variable for a 6-pack of Budweiser light whose price is to be based upon (e.g., a weighted average of) the prices of the light 6-packs in every other brand. Process 320 then uses the single price generated by process 310 as inputs to the marketing models. These inputs capture the impact of competing product prices in a statistically significant manner.

Figure 5:
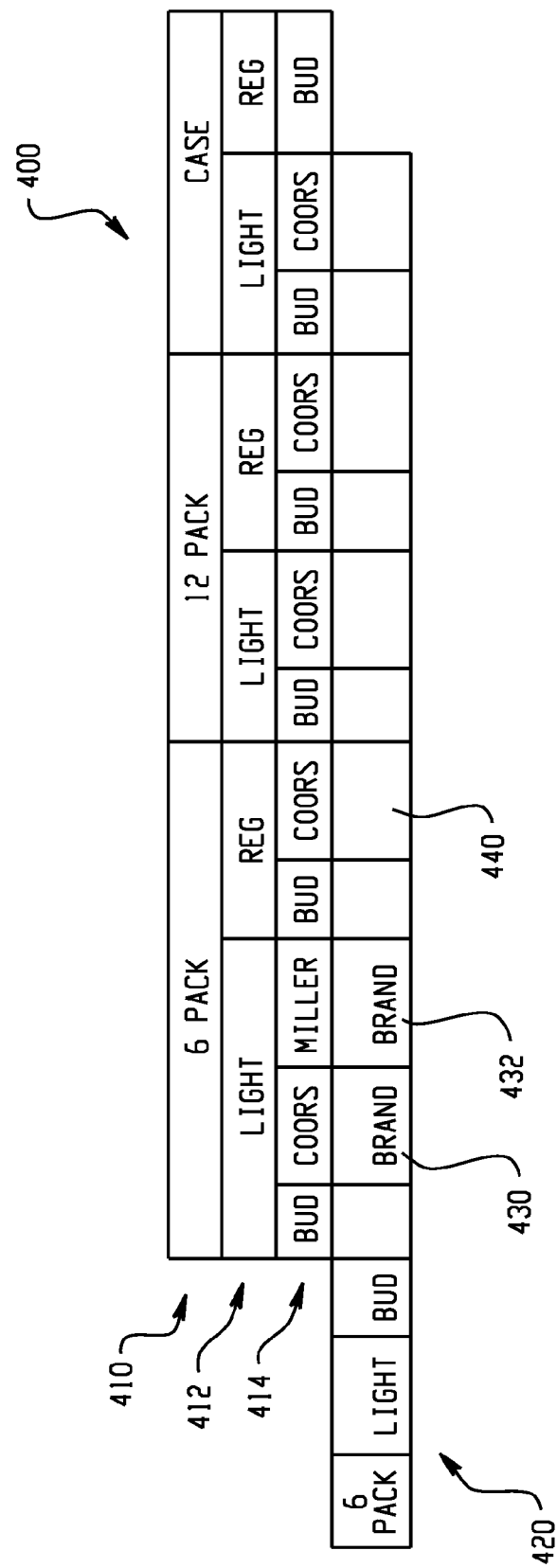
FIG. 5 is a chart that provides a visual depiction of the processing performed by the steps in FIG. 4.

FIG. 5 provides a visual depiction of the processing performed by the steps in FIG. 4. Chart 400 in FIG. 5 lists the products contained in the analysis as broken down by the following attributes:

Packaging size as shown in row 410 (e.g., 6-pack, 12-pack, case).
Beer type as shown in row 412 (e.g., light beer and regular beer).
Brand as shown in row 414 (e.g., Bud, Coors, and Miller beer).

The information depicted at reference numeral 420 shows what specific product and attributes are under analysis (e.g., 6-pack of Bud Light beer). The system can examine cross-price effects by selecting one of the attributes, such as "brand." To find the brand competitors, the system finds all the competing products that are the same in all other attributes except brand. In this example, the system determines that because brand is the selected attribute, the other attributes that must be the same (for the competing products' data to be considered) are: the packaging size and type attributes.

Cells 430 and 432 fit this cross-pricing inclusion criteria. Cell 430 is a product that differs with respect to the selected cross-price variable value (i.e., brand="Bud") because the brand associated with cell 430 is Coors which is different than Bud. Cell 430 also is a product whose other attributes are the same as the product in question:

The packaging size attribute of cell 430 is "6-pack" (which is the same as the packaging size attribute for the product in question; i.e., "6-pack").
The type attribute of cell 430 is "Light" (which is the same as the type attribute for the product in question; i.e., "Light").

Accordingly, the price data associated with the product in cell 430 (i.e., Coors Light in a 6-pack) is used in determining the weighted average price in measuring competition from other brands.

Similarly, cell 432 fits the cross-pricing inclusion criteria. Cell 432 is a product that differs with respect to the selected cross-price variable value (i.e., brand="Bud") because the brand associated with cell 432 is Miller which is different than Bud. Cell 432 also is a product whose other attributes are the same as the product in question:

The packaging size attribute of cell 432 is "6-pack" (which is the same as the packaging size attribute for the product in question; i.e., "6-pack").
The type attribute of cell 432 is "Light" (which is the same as the type attribute for the product in question; i.e., "Light").

Accordingly, the price data associated with the product in cell 432 (i.e., Miller Light in a 6-pack) is used in determining the weighted average price in measuring competition from other brands.

In contrast, the product associated with cell 440 does not meet the cross-pricing inclusion criteria. While cell 440 may be a product that differs with respect to the selected cross-price variable value (i.e., brand="Bud") because the brand associated with cell 440 is Coors, cell 440 does contain another attribute whose value differs from the value of the product in question—that is, the type attribute of cell 440 is "Regular" (which is different than the type attribute for the product in question; i.e., "Light"). Accordingly, the price data associated with the product in cell 440 (i.e., Coors regular in a 6-pack) is not used in determining the brand weighted average price.

Figure 6:
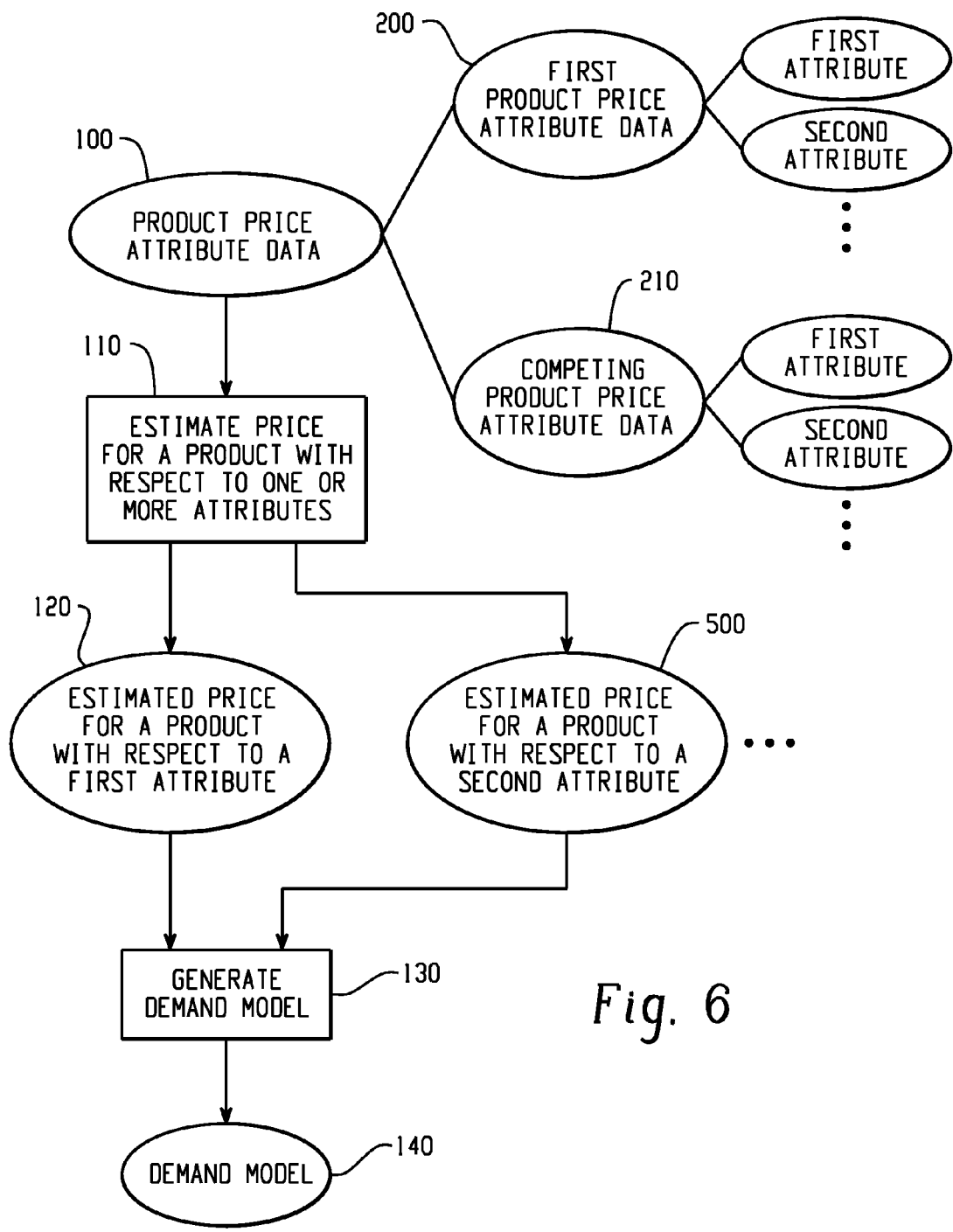
FIG. 6 is a process flow diagram illustrating the use of multiple attributes as cross-price variables.

It should be understood that similar to the other processing flows described herein, the steps and the order of the processing described in FIG. 5 may be altered, modified, removed and/or augmented and still achieve the desired outcome. For example, FIG. 6 illustrates that processing can include examining multiple attributes in a manner similar to the approach described above. More specifically, process 110 can estimate a price for the product in question not only with respect to a first attribute of the product, but process 110 can estimate prices (e.g., price 500) with respect to other attributes. The estimated prices generated by process 110 are used in generating the demand model 140.

Figure 7:
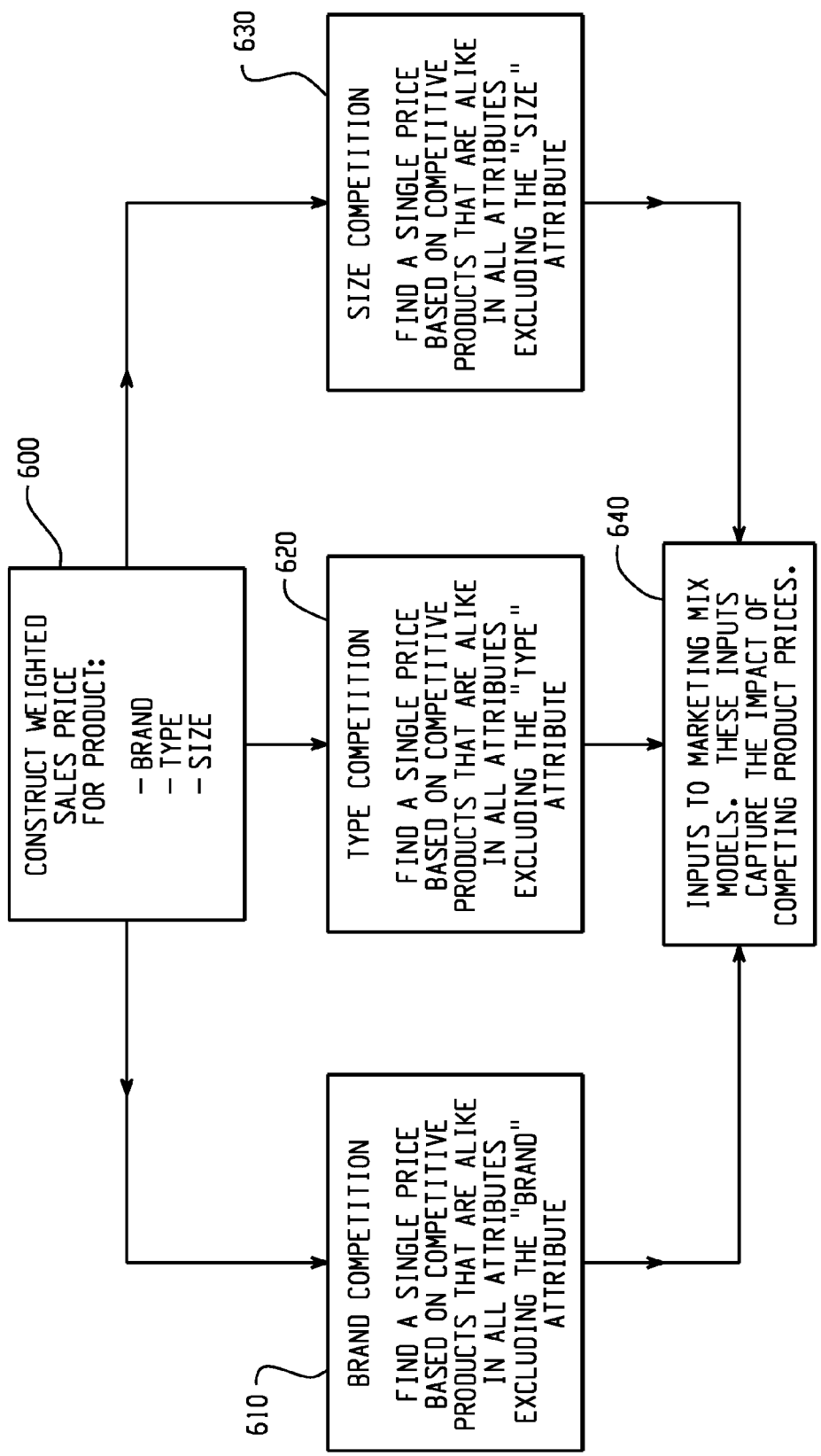
FIG. 7 is a flowchart depicting price estimations with respect to multiple attributes as cross-price variables.

FIG. 7 illustrates the price estimations with respect to multiple attributes within the context of the beer example. With reference to FIG. 7, process 600 receives data related to the product in question and competing products. The attributes under consideration are: brand, type, and pack size.

Processes 610, 620, and 630 select different attributes to determine which competing product prices should be included in estimating prices for the product in question. Process 610 examines brand competition by finding a single price based on competitive products that are alike in all attributes excluding the brand attribute. Similarly for "type" competition, process 620 finds all the products that are the same in all other attributes except type and uses the price of these products to determine a weighted average price to measure competition from other "types" of beers. For pack size competition analysis, process 630 finds all the products that are the same in all other attributes except pack size and uses the price of these products to determine a weighted average price to measure competition from other "sizes" of beers. It is noted that an analyst may decide that when people buy beer, cases are not a direct substitute for 6-packs, and in this case the system may be configured to not consider the price of such products.

As a result of processes 610, 620, and 630, multiple cross-price variables are generated: a cross-price brand variable (Bud, Coors, Miller); a cross-price type variable (light, regular); and a cross-price packaging size variable (6-pack, 12-pack, case, etc). These variables and their determined pricing information are used as inputs to marketing models for determining product demand.

Figure 8:
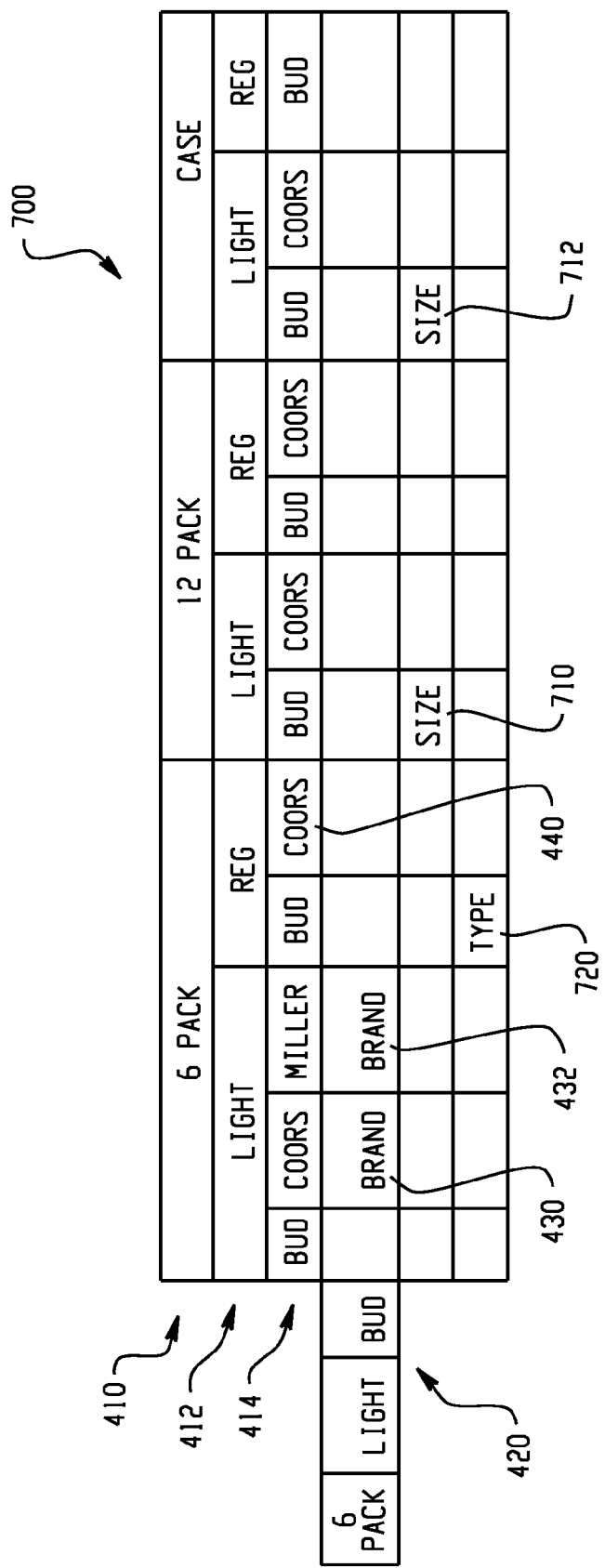
FIG. 8 is a chart that provides a visual depiction of the processing performed by the steps in FIG. 7.

FIG. 8 provides a visual depiction of the processing performed by the steps in FIG. 7. Chart 700 in FIG. 8 lists the products contained in the analysis as broken down by the following attributes:

Packaging size as shown in row 410 (e.g., 6-pack, 12-pack, case).

Beer type as shown in row 412 (e.g., light beer and regular beer).

Brand as shown in row 414 (e.g., Bud, Coors, and Miller beer).

Process 610 which performed brand competition analysis would use the product information associated with cells 430 and 432 to find a single price based on competitive products that are alike in all attributes excluding the brand attribute.

Process 620 which performed type competition analysis would use the product information associated with cell 720 because this cell contains a product whose attributes are the same in all other attributes except type. Accordingly, process 620 would use the product information associated with cell 720 to find a single price based on competitive products that are alike in all attributes excluding the type attribute.

Process 630 which performed size competition analysis would use the product information associated with cells 710 and 712 because these cells contain products whose attributes are the same in all other attributes except size. Accordingly, process 630 would use the product information associated with cells 710 and 712 to find a single price based on competitive products that are alike in all attributes excluding the size attribute.

Figure 9:
FIG. 9 is a chart depicting an approach for keeping track of attribute levels to help determine whether products can be considered as acceptable substitutes.

While examples have been used to disclose the invention, including the best mode, and also to enable any person skilled in the art to make and use the invention, the patentable scope of the invention is defined by claims, and may include other examples that occur to those skilled in the art. Accordingly the examples disclosed herein are to be considered non-limiting. As an illustration, FIG. 9 depicts at 800 an approach for keeping track of all the attribute levels to assist in determining whether products can be considered as acceptable substitutes or whether they differ significantly with respect to one or more attributes. In other words, the approach helps one to more easily find the relevant group of products that are identical, differ only by one attribute, two attributes, etc. Also, a product may differ by only one attribute, but the level of the attribute may differ by so much that it does not make sense to consider the products as substitutes. For example, consider again a 6-pack of 12 oz. bottles of Budweiser light. Certainly it seems reasonable to assume that a 12-pack of the same would be a good substitute, but how about a case. The analyst may decide that: the difference in packaging size is too large to consider it as a close substitute; its price should be averaged in with the price of the 12-pack; and/or should a separate cross-price variable be constructed.

To illustrate the approach of assessing product similarity/ differences and establishing thresholds or criteria for the removal from consideration products that are not suitable replacements, FIG. 9 illustrates an attribute differencing approach for products that are all 12 ounce bottles. Accordingly, this requires only three attributes to characterize them (i.e., the volume (oz.) attribute is not relevant for this group). Each product was given a three digit code (the number in the first row and column). The first digit indicates packaging size, the second, type of beer, and the third, brand. The numbers in the matrix were obtained by subtracting the row product number by the column product number.

Note that (the absolute value of) the matrix entries equal to 1, 10, or 100 indicate that the two products in question differ by one attribute and that they are only one level away from the product in question in that particular attribute. Entries whose absolute value equals 2, 20, or 200 indicate that the products differ by one attribute only—but in this case, the level of the attribute is 2 apart. Whether the fact that an attribute is 1 or 2 apart can make a difference and depends if the attribute in question is ordinal or not. For example, if a 1 indicates Coors versus Budweiser and a 2 indicates Coors versus Miller the magnitude of the number has no meaning—that is, both products differ from the Coors product only by brand and they would both be used in the calculation of cross-price brand variable. On the other hand, the difference between product combinations yielding 100 and 200 may be deemed significant. A 200 in the example illustrated above indicates a comparison of products which are identical except for the packaging size and the comparison is between a 6-pack and a case. A value of 100, on the other hand indicates a comparison between either a 6-pack and a 12-pack, or a 12-pack and a case. For this data, an analyst can decide that a value of 200 indicates the two products in question are not direct substitutes and thus, may not include these product combinations in the calculation of cross-price pack size (CPS). CPS only includes those products with a value of 100 (in absolute value).

Figure 10:
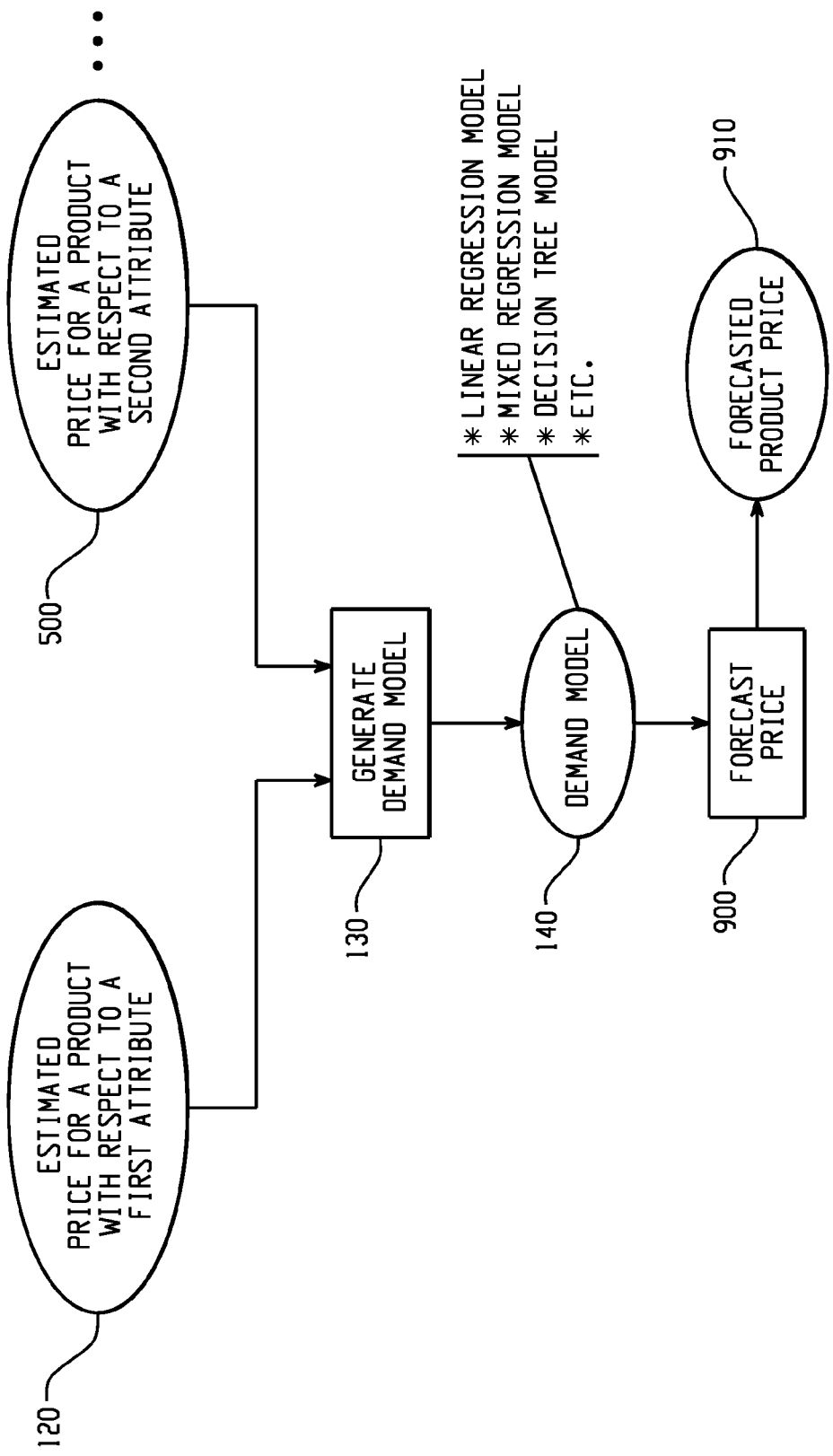
FIG. 10 is a process flow diagram depicting price forecasting.

As another illustration of the wide scope of the systems and methods disclosed herein, FIG. 10 depicts that the generated demand model 140 can be of many different types. For example, the estimated prices (120, 500, etc.) can be used in the construction of a demand model that could be a linear regression model, a mixed regression model, a decision tree model, etc. An optimization process 900 can then incorporate the demand model 140 into a forecasting routine so that a price 910 for the product in question can be forecasted.

Figure 11:
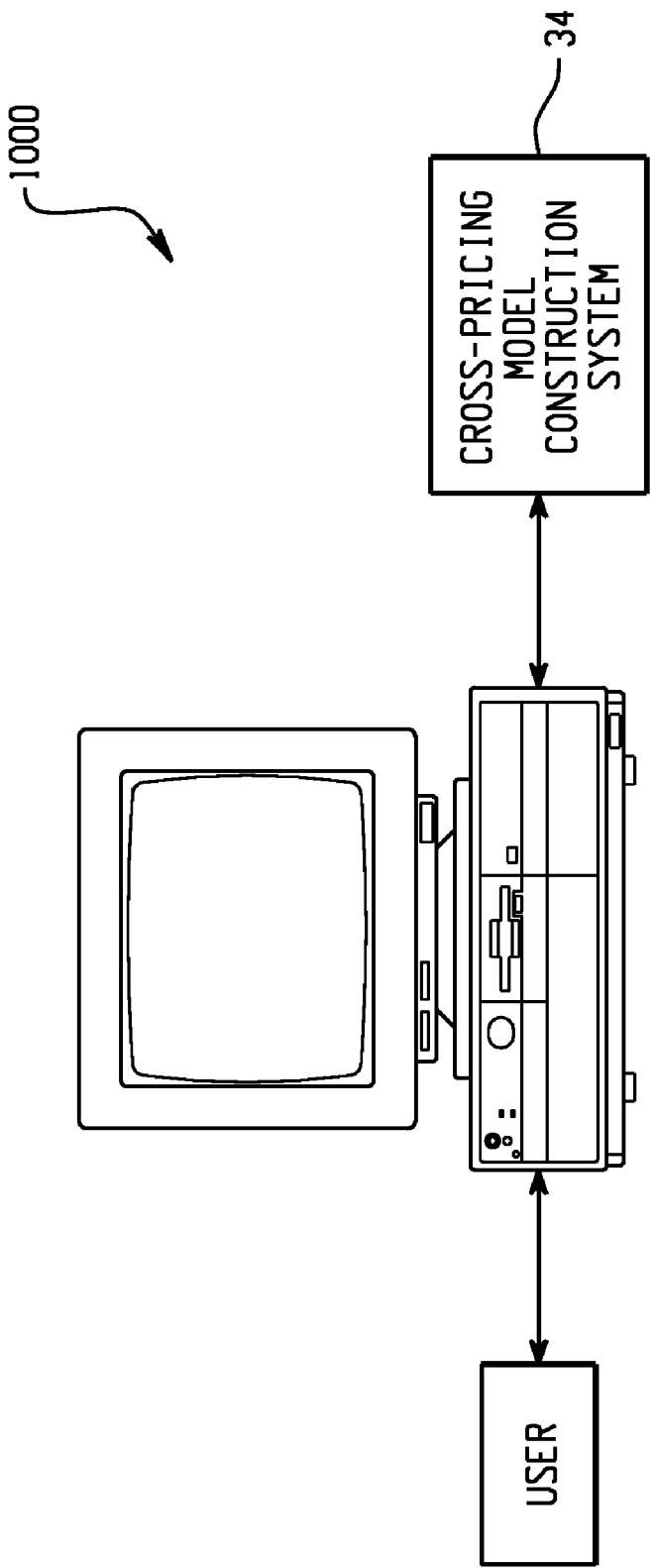
FIG. 11 is a block diagram depicting a single general purpose computer environment wherein a user can interact with a cross-pricing model construction system.

It is further noted that the systems and methods may be implemented on various types of computer architectures, such as for example on a single general purpose computer (as shown at 1000 on FIG. 11) or a workstation, or on a networked system, or in a client-server configuration, or in an application service provider configuration.

It is further noted that the systems and methods may include data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method for determining demand of products, comprising:
   receiving, using one or more data processors, price data and attribute data corresponding to one or more products, wherein each product is associated with at least one attribute;
   receiving, using the one or more data processors, a selection of a product;
   receiving, using the one or more data processors, a selection of an attribute associated with the selected product;
   comparing, using the one or more data processors, the selected product to each of the one or more products to determine a subset of the one or more products having the same associated attributes, except for the selected attribute;
   determining, using the one or more data processors, a degree of difference between the selected attribute and an associated attribute for each product in the subset;
   using, using the one or more data processors, the subset to determine a group of competing products, wherein each product in the group meets a pre-determined threshold corresponding to the degree of difference, and wherein each product in the group has an associated price;
   using, using the one or more data processors, the prices associated with each product in the group to determine a price for the selected product;
   generating, using the one or more data processors, a mathematical model using the determined price; and
   using, using the one or more data processors, the mathematical model to forecast a demand for the selected product.

2. The method of claim 1, wherein the determined price for the selected product is a statistically significant variable.

3. The method of claim 1, further comprising:
   receiving a selection of a second attribute associated with the selected product;
   comparing the selected product to each of the one or more products to determine a second subset of the one or more products having the same associated attributes, except for the selected second attribute; and
   using the prices associated with each product in the second subset to determine a second price for the selected product, wherein the mathematical model is generated using the determined price and the determined second price.

4. The method of claim 1, wherein the at least one attribute includes product brand, product type, and package size.

5. The method of claim 3, wherein the selected attribute is product brand and the selected second attribute is package size.

6. The method of claim 1, wherein the mathematical model is a linear regression model.

7. The method of claim 6, wherein the determined price is an input to the linear regression model.

8. The method of claim 6, further comprising:
   using the forecasted demand to determine a predicted price for the product using an optimization model.

9. The method of claim 1, wherein the subset does not include products that differ from the selected product on two or more attributes.

10. A system for determining demand of products, comprising:
    one or more processors;
    one or more computer-readable storage mediums containing instructions configured to cause the one or more processors to perform operations including:
    receiving price data and attribute data corresponding to one or more products, wherein each product is associated with at least one attribute,
    receiving a selection of a product;
    receiving a selection of an attribute associated with the selected product;
    comparing the selected product to each of the one or more products to determine a subset of the one or more products having the same associated attributes, except for the selected attribute;
    determining a degree of difference between the selected attribute and an associated attribute for each product in the subset;
    using the subset to determine a group of competing products, wherein each product in the group meets a pre-determined threshold corresponding to the degree of difference, and wherein each product in the group has an associated price;
    using the prices associated with each product in the group to determine a price for the selected product;
    generating a mathematical model using the determined price; and
    using the mathematical model to forecast a demand for the selected product.

11. A computer program product for determining demand of products, tangibly embodied in a machine-readable storage medium, including instructions configured to cause a data processing system to:

receive price data and attribute data corresponding to one or more products, wherein each product is associated with at least one attribute;
receive a selection of a product;
receive a selection of an attribute associated with the selected product;
compare the selected product to each of the one or more products to determine a subset of the one or more products having the same associated attributes, except for the selected attribute;
determine a degree of difference between the selected attribute and an associated attribute for each product in the subset;
use the subset to determine a group of competing products, wherein each product in the group meets a pre-determined threshold corresponding to the degree of difference, and wherein each product in the group has an associated price;
use the prices associated with each product in the group to determine a price for the selected product;
generate a mathematical model using the determined price; and
use the mathematical model to forecast a demand for the selected product.

* * * * *

UNITED STATES PATENT AND TRADEMARK OFFICE
CERTIFICATE OF CORRECTION

| | | |
|---|---|---|
| PATENT NO. | : 7,930,200 B1 | Page 1 of 2 |
| APPLICATION NO. | : 11/934397 | |
| DATED | : April 19, 2011 | |
| INVENTOR(S) | : McGuirk et al. | |

It is certified that error appears in the above-identified patent and that said Letters Patent is hereby corrected as shown below:

In column 7, line 60, delete the first instance of "using" and insert --determining--.

In column 7, line 60, delete "the subset to".

In column 7, line 61, delete "determine".

In column 7, line 61, insert --using the subset-- after the word "products".

In column 7, line 65, delete the first instance of "using" and insert --determining--.

In column 7, line 65, delete "the prices".

In column 7, line 66, delete "associated with each product in the group to determine".

In column 7, line 67, insert --using the prices associated with each product in the group-- after the word "product".

In column 8, line 3, delete the first instance of "using" and insert --forecasting--.

In column 8, line 3, delete "the math-".

In column 8, line 4, delete "ematical model to forecast".

In column 8, line 5, insert --at the determined price using the mathematical model-- after the word "product".

In column 8, line 9, delete "receiving" and insert --receiving, using the one or more data processors,--.

In column 8, line 11, delete "comparing" and insert --comparing, using the one or more data processors,--.

In column 8, line 15, delete entire row.

Signed and Sealed this
Thirty-first Day of May, 2011

David J. Kappos
*Director of the United States Patent and Trademark Office*

In column 8, line 16, delete "subset to determine" and insert --determining, using the one or more data processors,--.

In column 8, line 16, insert --using the prices associated with each product in the second subset-- after "uct".

In column 8, line 29, delete "using the forecasted demand to determine" and insert --determining, using the one or more data processors,--.

In column 8, line 30, insert --the forecasted demand and-- after the word "using".

In column 8, line 53, delete "using the subset to determine" and insert --determining--.

In column 8, line 54, insert --using the subset-- after "ucts".

In column 8, line 58, delete entire row.

In column 8, line 59, delete "to determine" and insert --determining--.

In column 8, line 59, insert --using the prices associated with each product in the group-- after "product".

In column 8, line 62, delete "using the mathematical model to forecast" and insert --forecasting--.

In column 8, line 63, insert --at the determined price using the mathematical model-- after the word "product".

In column 10, line 1, delete "use the subset to".

In column 10, line 1, insert --subset the subset-- after the word "products".

In column 10, line 6, delete entire row.

In column 10, line 7, insert --using the prices associated with each product in the group-- after the word "product".

In column 10, line 10, delete "use the mathematical model to".

In column 10, line 11, insert --at the determined price using the mathematical model-- after the word "product".